United States Patent
Tsuzaki et al.

(10) Patent No.: US 9,701,172 B2
(45) Date of Patent: Jul. 11, 2017

(54) BLOWING CONTROL APPARATUS FOR SEAT AND VEHICLE SEAT PROVIDED THEREWITH

(71) Applicant: TOYOTA BOSHOKU KABUSHIKI KAISHA, Aichi-ken (JP)

(72) Inventors: Atsushi Tsuzaki, Toyota (JP); Tomoko Hayakawa, Toyota (JP); Masahiko Onuma, Nagakute (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 1074 days.

(21) Appl. No.: 13/681,870

(22) Filed: Nov. 20, 2012

(65) Prior Publication Data

US 2013/0137354 A1    May 30, 2013

(30) Foreign Application Priority Data

Nov. 24, 2011   (JP) ................................ 2011-256754

(51) Int. Cl.
*B60H 1/00*  (2006.01)
*B60N 2/56*  (2006.01)

(52) U.S. Cl.
CPC ....... *B60H 1/00457* (2013.01); *B60N 2/5635* (2013.01); *B60N 2/5657* (2013.01); *B60H 1/00285* (2013.01)

(58) Field of Classification Search
None
See application file for complete search history.

(56) References Cited

U.S. PATENT DOCUMENTS

| | | | | |
|---|---|---|---|---|
| 7,567,045 B2* | 7/2009 | Fristedt | ................ | H02P 7/29 318/400.01 |
| 2007/0144120 A1* | 6/2007 | Kawasaki | ............ | B60H 3/0608 55/385.3 |
| 2007/0146148 A1* | 6/2007 | Kawasaki | .......... | B01D 46/0086 340/607 |
| 2007/0234742 A1* | 10/2007 | Aoki | .................. | B60H 1/00285 62/3.3 |

(Continued)

FOREIGN PATENT DOCUMENTS

JP    47-030149    11/1972
JP    49-110137 A2    10/1974
(Continued)

OTHER PUBLICATIONS

German Official Action for DE 10 2012 221 415.1, dated Jul. 21, 2015, along with English-language translation thereof.
(Continued)

*Primary Examiner* — Shelley Chen
(74) *Attorney, Agent, or Firm* — Greenblum & Bernstein, P.L.C.

(57) ABSTRACT

A blowing control apparatus for a seat, that includes a blower, and an air hole that is provided in a seating surface and through which air blown from the blower passes, also includes a measuring portion that measures a rotation speed or a current value of the blower as a blower measurement value, and a control portion that determines a degree to which the air hole is obstructed according to the blower measurement value measured by the measuring portion, and controls rotation of the blower by a driving voltage of the blower based on the degree.

8 Claims, 4 Drawing Sheets

(56) References Cited

U.S. PATENT DOCUMENTS

2010/0287880 A1\* 11/2010 Yasunaga .............. A61J 7/0084
53/64

FOREIGN PATENT DOCUMENTS

| JP | 53-096743 U | 8/1978 |
| JP | 2003-326961 | 11/2003 |
| JP | 2005-34345 | 2/2005 |
| JP | 2007-168706 A | 7/2007 |
| JP | 2007168706 A \* | 7/2007 |
| JP | 2007-297034 A | 11/2007 |

OTHER PUBLICATIONS

Japan Office action, dated Feb. 27, 2015 along with a partial English-language translation thereof.

\* cited by examiner

F I G. 4A
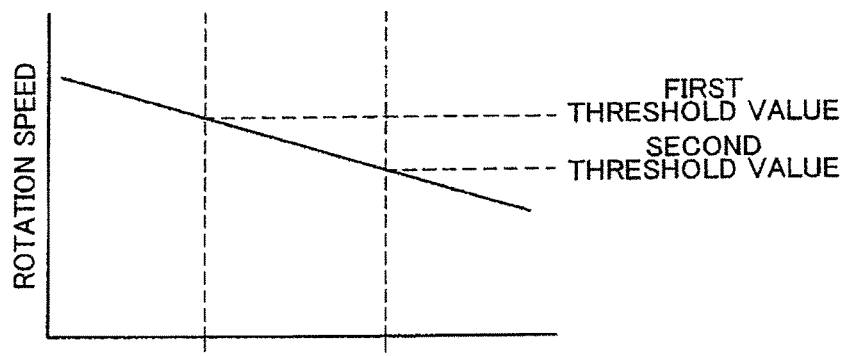
F I G. 4B
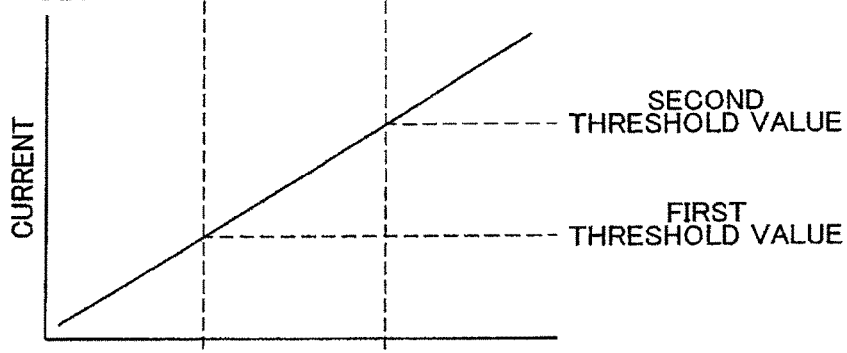
F I G. 4C
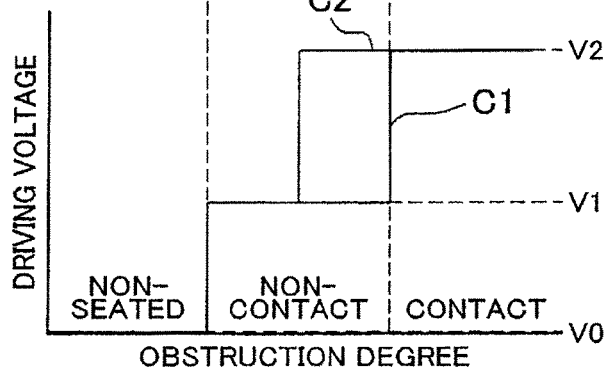

BLOWING CONTROL APPARATUS FOR SEAT AND VEHICLE SEAT PROVIDED THEREWITH

INCORPORATION BY REFERENCE

The disclosure of Japanese Patent Application No. 2011-256754 filed on Nov. 24, 2011 including the specification, drawings and abstract is incorporated herein by reference in its entirety.

BACKGROUND OF THE INVENTION

1. Field of the Invention

The invention relates to a blowing control apparatus for a seat, that blows air at a seated person from inside the seat. More particularly, the invention relates to a blowing control apparatus for a seat that suppresses an increase in blowing noise due to a posture of a seated person, and to a vehicle seat provided with this blowing control apparatus.

2. Description of Related Art

Japanese Patent Application Publication No. 2005-34345 (JP 2005-34345 A), for example, describes a vehicle seat air conditioning apparatus that includes a blower in a hollow cavity provided inside a seat cushion, and that blows temperature-controlled air blown by this blower to a seat surface side through tiny passage portions provided in a seat cover, in order to blow air at a seated person. With the vehicle seat air conditioning apparatus described in JP 2005-34345 A, multiple tiny passage portions are provided in the seat surface side. Forming conical air passages in which the sectional area increases toward the tiny passage portions at outlet ports of the blower makes it possible to smooth out the flow of blown air, suppress blowing noise, and increase the amount of blown air. On the other hand, with onboard electronic equipment such as audiovisual equipment and navigation equipment mounted in the vehicle, a cooling fan is typically provided to prevent damage due to heat generation. However, when the cooling fan is operated at a high speed to increase the cooling effect, noise (e.g., wind noise) increases, which may be bothersome to an occupant. Japanese Patent Application Publication No. 2003-326961 (JP 2003-326961 A), for example, describes an on-board electronic equipment cooling fan control apparatus that increases the cooling effect without bothering an occupant by this kind of cooling fan noise.

With the vehicle seat provided with this kind of related air conditioning apparatus, there is a need for a seated person to be sufficiently cooled, while reducing blowing noise that is bothersome to a seated person. More particularly, when an air conditioning apparatus is provided in a backrest of a seat, noise from the air conditioning apparatus is easily heard by a seated person due to the fact that the blower and the air passage portions (i.e., the air holes) formed in the seat cover are locations that are close to the ears of the seated person. Also, normally, the posture of a seated person changes, and the degree of contact, as well as the contact portion and contact area, between the body of the seated person and the seat also change according to the seated posture. For example, when multiple tiny air holes are formed in the cover of the backrest of the seat and a seated person is seated contacting the seat, the majority of the air holes will be obstructed by the back of the seated person, so the noise from the blower and the blown air will be small. However, if the seated person then changes his or her posture such that a gap is created between the back of the seated person and the seat, the degree to which the air holes will be obstructed (i.e., the obstructed area) decreases, so noise that escapes from the air holes will be larger and may bother the seated person. That is, even if the operation of the blower is substantially constant, the noise level felt by the seated person changes greatly depending on the posture of the seated person. With the vehicle seat air conditioning apparatus described in JP 2005-34345 A, this kind of change in the blowing noise due to the posture of a seated person is not taken into consideration. In addition, it is also possible to suppress noise by making the structure of the air path from the blower to the seat surface complex. However, doing so would not only affect the blowing performance that is most important as well as lead to an increase in weight, which would be problematic, but it would do nothing to solve the problem of the blowing noise increasing due to the posture of a seated person. Also, with the cooling fan control apparatus described in JP 2003-326961 A, the vehicle speed is detected, and the rotation speed of a cooling fan (an electric motor fan) of on-board electronic equipment is variably controlled according to this vehicle speed. That is, as the vehicle speed increases, the noise that enters the vehicle from outside also increases. Therefore, control is performed such that the rotation speed of the cooling fan is increased when the vehicle speed is fast, so the noise of the cooling fan blends in with the surrounding noise and is not heard by the occupant.

SUMMARY OF THE INVENTION

The invention thus provides a blowing control apparatus that suppresses an increase in blowing noise due to a posture of a seated person in a seat that blows air at the seated person from inside the seat, as well as a vehicle seat provided with this blowing control apparatus.

A first aspect of the invention relates to a blowing control apparatus for a seat, that includes a blower, and an air hole that is provided in a seating surface and through which air blown from the blower passes. This blowing control apparatus for a seat includes a measuring portion that measures a rotation speed or a current value of the blower as a blower measurement value, and a control portion that determines a degree to which the air hole is obstructed according to the blower measurement value measured by the measuring portion, and controls rotation of the blower by a driving voltage of the blower based on the degree.

In this aspect of the invention, a first threshold value for determining that there is no human body on the seating surface according to the blower measurement value, and a second threshold value for determining that a human body is contacting the seating surface, may be set. Also, the control portion may decrease the rotation speed of the blower or stop rotation of the blower when it is determined that there is no human body on the seating surface, and increase the rotation speed of the blower when it is determined that a human body is contacting the seating surface. Moreover, the control portion may increase or decrease the rotation speed of the blower according to the blower measurement value when the blower measurement value is a value between the first threshold value and the second threshold value. Also, a second aspect of the invention relates to a vehicle seat provided with the blowing control apparatus for a seat having the structure described above.

According to the blowing control apparatus for a seat having the structure described above, the rotation speed or the current value of the blower is measured as the blower measurement value, and the degree of obstruction of the air hole provided in the seating surface is determined by the control portion according to this blower measurement value. For example, when most of the air hole is obstructed when the body of a seated person is contacting the seating surface of the seat, the blowing noise level heard by the seated person is low. On the other hand, when the body of a seated person is off of the seat such that the degree to which the air hole is obstructed is lower, the blowing noise level heard by the seated person is greater. The rotation speed and the current value of the blower differ depending on the degree to which the air hole is obstructed, so the degree of contact between the seated person and the seating surface of the seat, i.e., the posture of the seated person, is able to be determined by measuring the rotation speed or the current value as the blower measurement value. Also, the rotation of the blower is controlled by the control portion based on this determination, so even if the posture of the seated person changes, air conditioning of the seat can be effectively maintained, and noise from the blower and blowing air that is heard by the seated person can be suppressed.

When the first threshold value for determining that there is no human body on the seating surface according to the blower measurement value, and the second threshold value for determining that a human body is contacting the seating surface, are set, and the control portion decreases the rotation speed of the blower or stops rotation of the blower when it is determined that there is no human body on the seating surface, and increases the rotation speed of the blower when it is determined that a human body is contacting the seating surface, the presence and seated posture of a seated person can be easily determined from the detected blower measurement value, and control can be performed to rotate the blower appropriately. Also, when the control portion increases or decreases the rotation speed of the blower according to the blower measurement value when the blower measurement value is a value between the first threshold value and the second threshold value, the control portion performs control to rotate the blower appropriately according to the degree to which the body of a seated person is off of the seating surface or the degree to which the seated person is contacting the seating surface.

In the vehicle seat provided with the blowing control apparatus for a seat described above, the degree to which the air hole is obstructed is determined and rotation of the blower is controlled based on this determination. Therefore, even if the posture of a seated person changes, air conditioning of the seat is able to be effectively maintained, and noise from the blower and blowing air that is heard by the seated person is able to be suppressed. Also, a vehicle seat provided with a blowing apparatus is able to be formed with fewer parts, without increasing the complexity of the structure of the blower or the air path from the blower to the seating surface. As a result, a vehicle seat in which a seated person will not be bothered by blowing noise is able to be made lightweight and realized at a low cost.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIGS. 4A to 4C are graphs illustrating an example of control by the blowing control apparatus, that show the relationships between blower measurement value and air hole obstruction degree, and blower driving voltage corresponding to this obstruction degree.

DETAILED DESCRIPTION OF EMBODIMENTS

Figure 1:
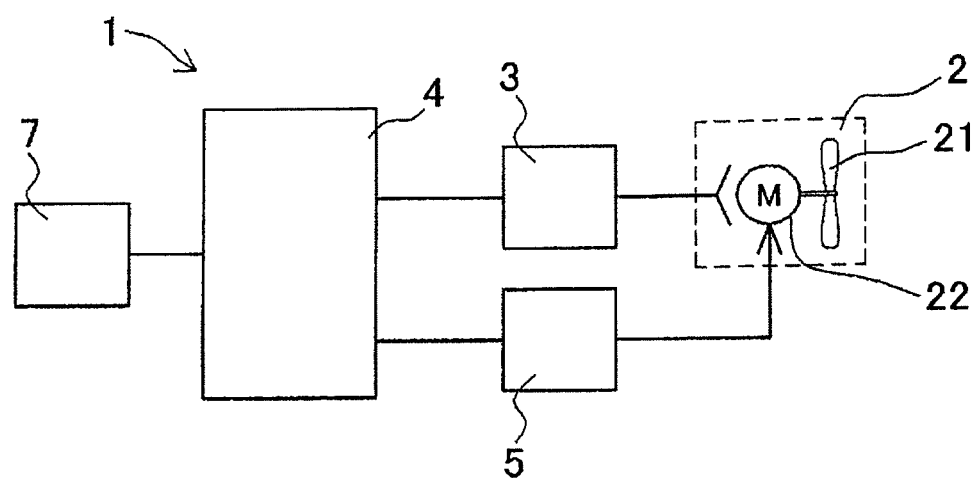
FIG. 1 is a block diagram of the structure of a blowing control apparatus for a seat according to one example embodiment of the invention.

Hereinafter, a blowing control apparatus for a seat and a vehicle seat provided with this blowing control apparatus according to example embodiments of the invention will be described in detail with reference to FIGS. 1 to 5. The points illustrated here are exemplary and are intended to exemplarily describe example embodiments of the invention, and are considered to most effectively describe, in an easy-to-understand manner, the principles and conceptual characteristics of the invention. Regarding this, the description is not intended to give a more detailed description of the structure of the invention than is necessary to gain a fundamental understanding of the invention. The description and the drawings are intended to reveal to one skilled in the art how to actually embody several modes of the invention.

The blowing control apparatus for a seat according to one example embodiment of the invention is a blowing control apparatus that can be applied to a seat provided with a blower, and air holes that are provided in a seating surface and through which air blown from the blower passes. This blowing control apparatus includes a measuring portion that measures a rotation speed or a current value of the blower as a blower measurement value, and a control portion that determines the degree to which the air holes of the seat are obstructed according to the blower measurement value measured by the measuring portion, and controls the rotation of the blower by driving current of the blower based on that degree.

A seat in which the blowing control apparatus is arranged may be an air-conditioned seat for arbitrary use such as for use in a vehicle, for use indoors, or for use outdoors or the like. This blowing control apparatus for a seat is able to be suitably used in a vehicle seat of an automobile in particular. The term "seating surface" refers to a seat surface that contacts the body of a seated person, and includes a surface of a seat cushion that supports the buttocks and thighs of a seated person, as well as a surface of a backrest that supports the hips and back of the seated person. The type and location where the blower is arranged, as well as the duct structure that introduces air blown from the blower into the seat, and the like are not particularly limited. The air holes are holes or voids that are provided in a seating surface of the seat and through which air blown from the blower passes to outside of the seat, and the shape, size, and number and the like thereof are not particularly limited. For example, the air holes may be multiple tiny holes provided passing through a surface member of the seat that constitutes the seating surface, or voids in breathable woven fabric or the like. Also, air holes may be provided separately in positions other than the seating surface (such as a leg rest or an armrest or the like), and the air from the blower may be blown at the body of a seated person from there.

If the body of a seated person is covering the air holes, the air holes will be obstructed. Therefore, the degree to which all of the air holes are obstructed or the obstructed area (hereinafter referred to as the "obstruction degree") differs depending on whether there is a person seated in the seat, and if there is a seated person, the seated posture of the seated person. Noise produced by operation of the blower and airflow in the duct and the like escapes outside via the air holes. The noise is more easily heard by the seated person the lower the obstruction degree is, i.e., the larger the area of the seating surface that is not contacted by a part of the body of the seated person is.

FIG. 1 is a view of the structure of the blowing control apparatus for a seat according to this example embodiment. A blower 2 that includes a fan 21 and a motor (i.e., a direct-current motor) 22 is provided in the seat. The blowing control apparatus 1 for a seat (hereinafter simply referred to as "blowing control apparatus 1") includes a measuring circuit (measuring portion) 3 that actually measures the rotation speed or current value or the like of the blower 2, and a control portion 4 that controls the operation of the motor of the blower 2 based on the blower measurement value measured by the measuring circuit 3. Also, an operating switch 7 that a seated person or the like uses to turn the blowing of air on and off and set the blowing force may be connected to the blowing control apparatus 1.

The blower measurement value may be any measurement value from among the rotation speed of the motor 22, the current value of current flowing to the motor 22, and a power value of power supplied to the motor 22 or the like. Even if the motor 22 is driven by a constant voltage, for example, the rotation speed and the current value of the motor 22 will change according to the size of the load. Also, the noise (wind noise and the like) produced by the blower 2 and the noise produced by the airflow inside the duct increases as the rotation speed of the fan 21 and the motor 22 increases. The blower measurement value may be obtained by any appropriate method. For example, the rotation speed may be detected by providing a counter that counts a signal that accompanies rotation of a shaft of the motor 22. Also, the current value can easily be detected by providing an AD converter and a detecting circuit that detects current flowing to the motor 22, and the like.

The control portion 4 may be formed by only hardware, or it may be formed by both hardware and software using a microprocessor and the like, for example. The control portion 4 may preferably be formed by a microcontroller (i.e., a microcomputer) that includes a CPU, memory (ROM and RAM) and an input/output circuit and the like, as well as peripheral circuitry, but the invention is not limited to this. That is, the control portion 4 may also be formed by a programmable logic circuit, a gate array, or another logic circuit. The control portion 4 may be configured to obtain the blower measurement value with the measuring circuit 3, determine the obstruction degree of the air holes from this value, and change the operation of the motor 22 based on this obstruction amount and an operating command set by the operating switch 7.

The motor 22 is configured to receive a supply of electric power from a motor power supply, and the operation of the motor 22 is controlled by the control portion 4 via a drive circuit 5. For example, the motor 22 may be configured to change rotation speed by a predetermined drive signal being output from the control portion 4 to the drive circuit 5, and the driving voltage to the motor 22 being controlled according to this drive signal. The control method of the driving voltage may be selected as appropriate. For example, voltage in the form of pulses may be applied, or the applied voltage value may be changed.

Preferably the drive signal may be a pulse-width modulation (PWM) signal, and the driving voltage to the motor 22 may be controlled according to PWM control. PWM control is a control method that changes the rotation speed of the motor by changing the average value of voltage applied to a motor, which is accomplished by changing a duty ratio (i.e., a ratio of on-time to the cycle of the pulse signal). A pulse-width modulated drive signal is sent to the drive circuit 5 by the control portion 4. The drive circuit 5 is formed by a transistor or an FET, and is a circuit that applies driving voltage to the motor 22 according to the drive signal output from the control portion 4. The power supplied to the motor 22 is adjusted by changing the amount of driving voltage with the drive circuit 5. In PWM control, power from the motor power supply is intermittently applied to the motor 22 by a switch element such as a transistor that forms the drive circuit 5 being switched according to the drive signal. The voltage applied to the motor 22 changes according to the duty ratio of this drive signal, so the rotation speed of the motor 22 is able to be adjusted.

The necessary power is supplied to the blowing control apparatus 1 and the blower 2 by a power supply, not shown. In the case of a vehicle seat, for example, the power supply may receive power from a battery of the vehicle.

Figure 2:
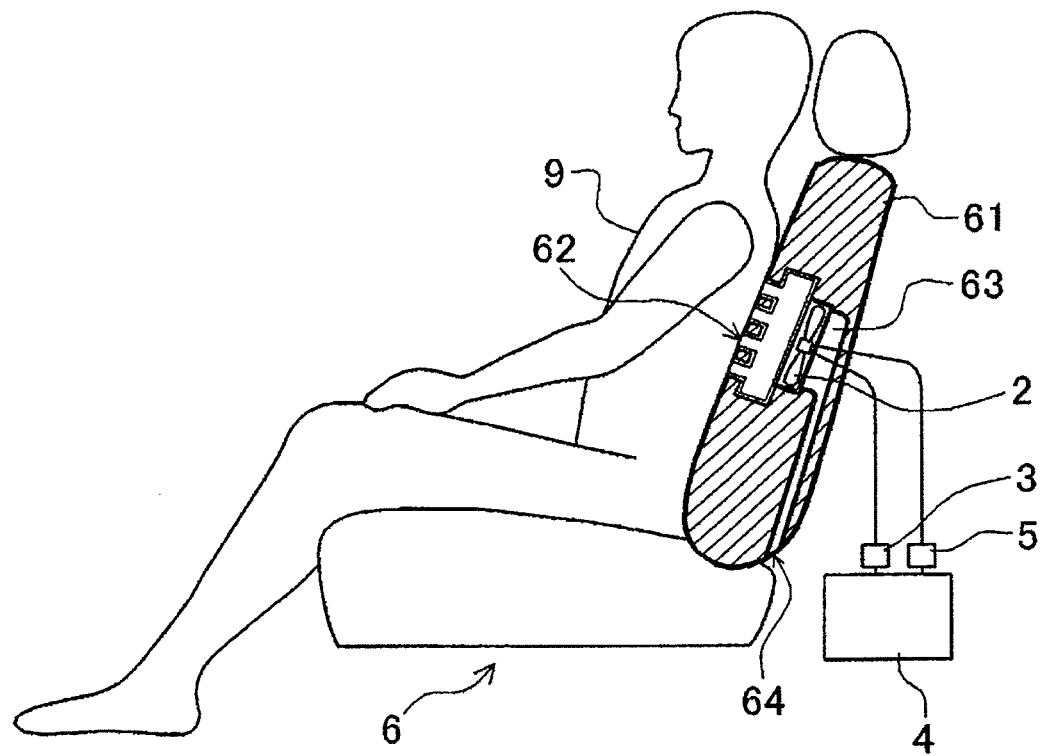
FIG. 2 is a view showing a frame format of an example of a vehicle seat in which the blowing control apparatus is arranged, in a state in which air holes are obstructed by a seated person.
Figure 3:
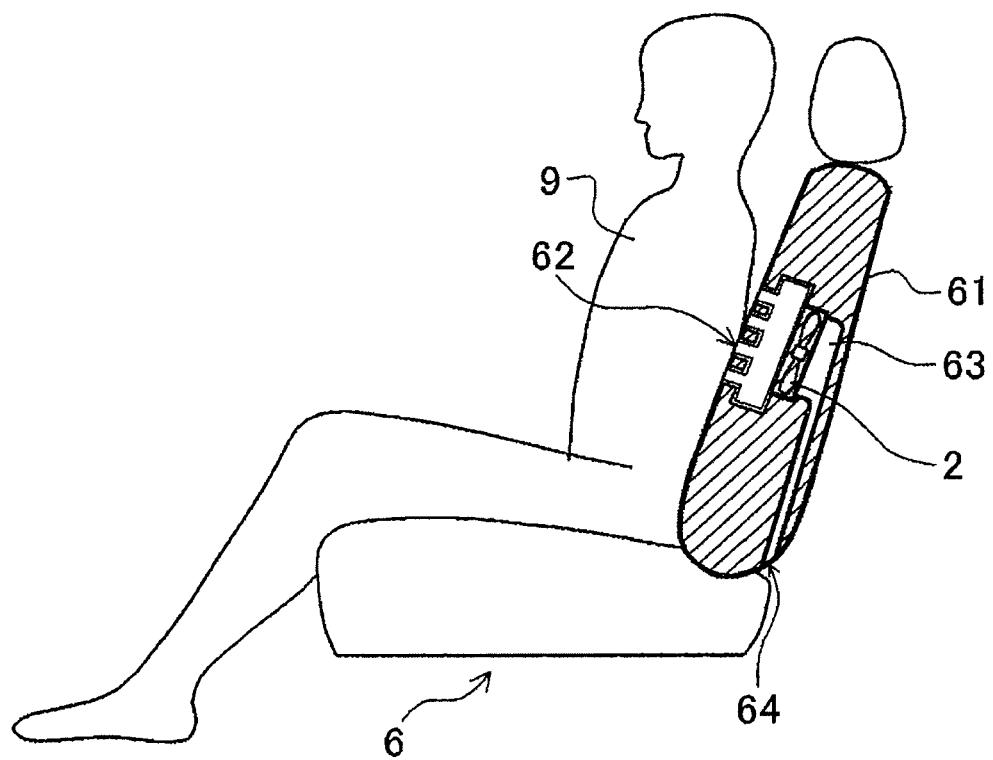
FIG. 3 is a view showing a frame format of an example of the vehicle seat in which the blowing control apparatus is arranged, in a state in which the upper back of the seated person is separated from the seating surface such that some the air holes are not obstructed.

FIGS. 2 and 3 are views of an example of a vehicle seat provided with the blowing control apparatus 1. The blower 2 is provided in a hollow portion 63 formed inside a backrest 61 of a vehicle seat 6. Also, the hollow portion 63 forms a duct that leads airflow from an intake port 64 provided in a lower portion of the backrest 61 or the like to a plurality of air holes 62 provided in a seating surface that contacts a seated person 9. As a result, air is blown toward the seated person 9 through the plurality of air holes 62. FIG. 2 is a view showing a state (i.e., a contact state) in which the body of the seated person 9 is contacting the seating surface, such that the air holes 62 are obstructed by the body of the seated person 9. FIG. 3 is a view showing a state (i.e., a non-contact state) in which the upper body of the occupant 9 is separated from the seating surface, such that some of the air holes 62 are not obstructed. Also, all of the air holes 62 are open when no one is seated in the seat 6 (i.e., a non-seated state).

The blowing control apparatus 1 is connected to the vehicle seat 6. The blowing control apparatus 1 may be configured as an electronic control unit (ECU) of a vehicle. The position and arrangement method of the portions of the blowing control apparatus 1 are not limited. The control portion 4 of the blowing control apparatus 1 detects the rotation speed or current value of the blower 2 with the measuring circuit 3. Then the control portion 4 operates the motor 22 of the blower 2 via the drive circuit 5. The fan 21 draws in air from the intake port 64 and blows the air toward the back of the seated person 9 from the air holes 62.

Hereinafter, a case in which the control portion 4 controls the driving voltage of the motor 22 according to PWM will be described. The rotation speed of the fan 21 is able to be adjusted by the duty ratio of the PWM. When the blower 2 is driven according to a given duty ratio, the load increases, and the rotation speed of the blower 2 decreases, as contact between the seated person and the seating surface increases and the air holes 62 become more obstructed. On the other hand, the load decreases, and the rotation speed of the blower 2 becomes faster, as contact between the seated person and the seating surface decreases and the air holes 62 become more open. When the rotation speed of the motor 22 becomes slower as the load increases due to the air holes becoming more obstructed, current flowing to the motor 22 consequently increases. Therefore, the obstruction degree of the air holes can be estimated by detecting the rotation speed of the motor 22 or the current of the motor 22, and the presence or the seated posture of a seated person is able to be determined based on this.

Also, when it is determined that the degree of contact between a seated person and the seating surface is high (i.e., when a contact state is determined), the control portion 4 performs control to increase the rotation speed of the motor 22 by increasing the duty ratio. When the rotation speed increases, the blowing noise also increases, but because the air holes 62 are obstructed, little noise escapes out of the seat, so the noise is not easily be heard by the seated person. As a result, a pleasant cooling sensation by the blown air is able to be increased without the seated person being bothered by the noise. On the other hand, when it is determined that the degree of contact between the seated person and the seating surface is low (i.e., when a non-contact state is determined), the control portion 4 performs control to reduce the rotation speed of the motor 22 by reducing the duty ratio. Although blowing noise escapes outside the seat through the unobstructed air holes 62, because the rotation speed is reduced, the blowing noise is also less, so a seated person is less likely to be bothered by the noise. Also, when it is determined that there is no seated person present (i.e., when a non-seated state is determined), blowing noise is able to be minimized by reducing the rotating speed of the motor 22 even more, or prevented all together by stopping the motor 22. The degree to which the rotation speed of the motor 22 is increased or decreased is able to be controlled based on the force of the blowing air that is set with the operating switch 7.

Figure 5A:
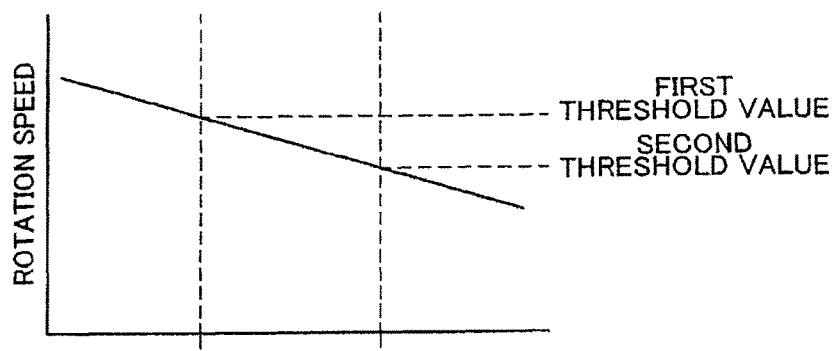
FIGS. 5A to 5C are graphs illustrating an example of other control by the blowing control apparatus, that show the relationships between blower measurement value and air hole obstruction degree, and blower driving voltage corresponding to this obstruction degree.
Figure 5B:
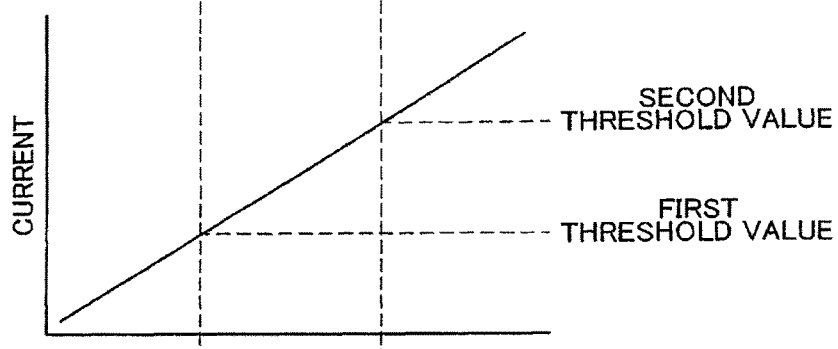

FIGS. 4A to 4C and 5A to 5C are charts showing detailed examples of control according to the blowing control apparatus 1. In all of the drawings, the horizontal axis represents the obstruction degree of the air holes. A low obstruction degree (toward the left along the axis) corresponds to a non-seated state in which the air holes are not obstructed, and a high obstruction degree (toward the right along the axis) corresponds to a contact state in which the air holes are obstructed. This example illustrates a case in which the seating state is divided into three states, i.e., a contact state, a non-contact state, and a non-seated state, according to the degree of obstruction. The way in which the seating state is divided may be determined as appropriate. Also, FIGS. 4A and 5A are examples in which the rotation speed of the blower 2 is detected as the blower measurement value by the measuring circuit 3, and FIGS. 4B and 5B are examples in which the current of the motor 22 is detected as the blower measurement value by the measuring circuit 3. The manner in which the rotation speed or current of the motor 22 change according to the load differs depending on the motor used and the like, but in this example, it will be denoted by a straight line.

Figure 5C:
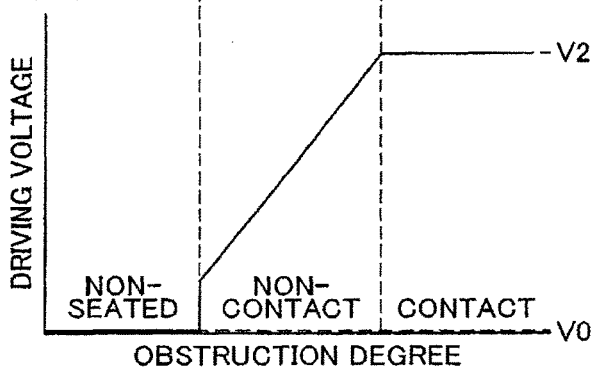

When the obstruction degree of the air holes is high, the rotation speed of the motor 22 will decrease and the current of the motor 22 will increase. In this kind of case, it can be determined that the seated person 9 is seated contacting the seating surface as shown in FIG. 2. On the other hand, when the obstruction degree of the air holes is low, the rotation speed of the motor 22 will increase, and the current of the motor 22 will decrease. In this kind of case, it can be determined that a person is not sitting in the seat (i.e., a non-seated state can be determined). Also, when the obstruction degree of the air holes is a value that is between the contact state and the non-seated state, it can be determined that the state is the non-contact state in which the seated person 9 is sitting with his or her body off of the seating surface as shown in FIG. 3. Therefore, as shown in FIGS. 4C and 5C, the control portion 4 is able to adjust the rotation speed of the motor 22 by changing the duty ratio (i.e., the driving voltage) based on the determination regarding the presence and seated posture of the seated person 9.

As a method of controlling the driving voltage corresponding to this kind of change in the obstruction degree, it is possible to provide any number of arbitrary threshold values for the blower measurement value corresponding to the obstruction degree, and perform control to change the driving voltage based on these threshold values, for example. FIG. 4C is a view of an example in which a first threshold for determining the non-seated state in which there is no seated person according to the blower measurement value, and a second threshold value for determining a contact state in which a seated person is contacting the seating surface are set in advance, and the control portion 4 reduces the rotation speed or stops the rotation of the blower 2 when the non-seated state is determined, and increases the rotation speed of the blower 2 when the contact state is determined. The first threshold value and the second threshold value may be set appropriately according to the actual characteristics of the blowing apparatus and the degree of obstruction of the air holes and the posture of a seated person and the like.

For example, as shown in FIG. 4A, when measuring the rotation speed of the motor 22 with the measuring circuit 3, the non-seated state is determined when the rotation speed is greater than the first threshold value, and the contact state is determined when the rotation speed is less than the second threshold value. Also, the non-contact state is determined when the rotation speed is between the first threshold value and the second threshold value. Similarly, as shown in FIG. 4B, when measuring the current of the motor 22 with the measuring circuit 3, the non-seated state is determined when the current value is below the first threshold value, and the contact state is determined when the current value is above the second threshold value. Also, the non-contact state is determined when the current value is between the first threshold value and the second threshold value.

The control portion 4 changes the driving voltage in a stepped manner based on this determination. When the non-seated state is determined, the control portion 4 performs control to reduce the rotation speed of the blower 2 or set it to zero by setting the driving voltage to V0 (a minimum value or zero). On the other hand, when the contact state is determined, the control portion 4 performs control to increase the rotation speed of the blower 2 by increasing the driving voltage to V2 (a maximum value). Also, when the non-contact state is determined, the control portion 4 may perform control (C1) that keeps the rotation speed of the blower 2 in the middle by setting the driving voltage to V1 in the middle, or may further set a third threshold value between the first threshold value and the second threshold value and perform control (C2) that sets the driving value to V1 and V2 with this third threshold value as the boundary.

FIG. 5C is a view of an example in which, when the blower measurement value is a value between the first threshold value and the second threshold value, i.e., in the non-contact state, control is performed to increase or decrease the rotation speed of the blower by linearly increasing or decreasing the driving voltage according to this blower measurement value. The relationship between the obstruction degree (i.e., the blower measurement value) and the driving voltage to be controlled may be set appropriately. In this example, control is performed to change the driving voltage substantially in proportion to the obstruction degree (i.e., increase the driving voltage as the obstruction degree increases). The value of the obstruction degree may be further divided into several ranges, and control may be performed to change the driving voltage in a stepped manner for each of these ranges.

As described above, by controlling the driving voltage according to the obstruction degree of the air holes, when there is no seated person present, air stops being blown regardless of the setting of the operating switch, thus preventing blowing noise from being produced. On the other hand when a seated person is seated contacting the seat, control is performed to increase the force of the blowing air, thus making it possible to give the seated person a sensation of air cooling, because little blowing noise will escape. Also, when the seated person is sitting with his or her body off of the seat, the force of the blowing air is adjusted according to the obstruction degree, so blowing noise is able to be suppressed and thus is not easily heard by the seated person.

The invention is not limited to the example embodiments described above, and may be carried out in any of a variety of modes within the scope of the invention according to the intended use. For example, the blowing control apparatus for a seat is not limited to the backrest described in the example embodiment, but may also be applied to a blowing apparatus provided in a seat cushion or the like. Also, the obstruction degree of the air holes may be determined not only by the rotation speed and the current, but also by detecting a pressure within a duct or the like, for example. Further, the control method of the driving voltage based on the obstruction degree of the air holes may be modified in any of a variety of ways and then applied.

What is claimed is:

1. A blowing control apparatus for a seat, that includes a blower, and an air hole that is provided in a seating surface and through which air blown from the blower passes, the blowing control apparatus comprising:
   a measuring circuit that measures a blower measurement value, the blower measurement value being at least one of a rotation speed of the blower and a current value of the blower; and
   a controller that determines a degree of obstruction of the air hole at the seating surface according to the blower measurement value measured by the measuring circuit, and controls rotation of the blower based on the determined degree of obstruction of the air hole at the seating surface by control of a driving voltage of the blower.

2. The blowing control apparatus for the seat according to claim 1, wherein
   when the blower measurement value corresponds to a first threshold value, the controller determines that there is no obstruction to the air hole at the seating surface,
   when the blower measurement value corresponds to a second threshold value, the controller determines that there is obstruction to the air hole at the seating surface, and
   the controller one of decreases the rotation speed of the blower and stops rotation of the blower when the controller determines that there is no obstruction to the air hole at the seating surface, and increases the rotation speed of the blower when the controller determines that there is an obstruction to the air hole at the seating surface.

3. The blowing control apparatus for the seat according to claim 2, wherein
   the controller one of increases and decreases the rotation speed of the blower according to the blower measurement value when the blower measurement value is a value between the first threshold value and the second threshold value.

4. The blowing control apparatus for the seat according to claim 3, wherein the controller changes a driving power of the blower in a stepped manner according to the blower measurement value when the blower measurement value is a value between the first threshold value and the second threshold value.

5. The blowing control apparatus for the seat according to claim 3, wherein the controller changes a driving power of the blower linearly according to the blower measurement value when the blower measurement value is a value between the first threshold value and the second threshold value.

6. The blowing control apparatus for the seat according to claim 2, further comprising an operating switch that at least one of turns the blowing of air on, turns the blowing of air off, and sets a force of the blowing air, wherein
   the controller one of increases and decreases the rotation speed of the blower based on the force of the blowing air set by the operating switch.

7. A vehicle seat provided with the blowing control apparatus according to claim 1.

8. The blowing control apparatus for the seat according to claim 1, wherein
   the blower includes a motor, and the blower measurement value is at least one of a rotation speed of the motor and a current of the motor.

* * * * *